Figures 5, 6:
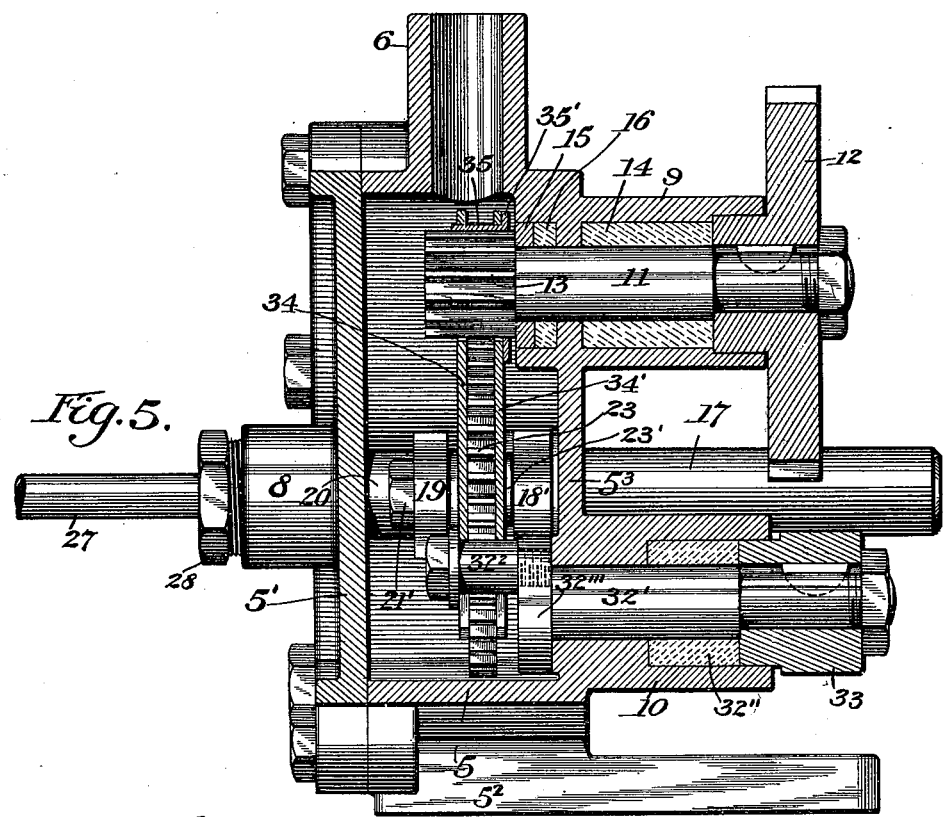

No. 666,841. Patented Jan. 29, 1901.
H. L. ARNOLD.
MECHANISM FOR MIXING AND MEASURING MATERIALS.
(Application filed May 7, 1900.)
(No Model.) 4 Sheets—Sheet 1.
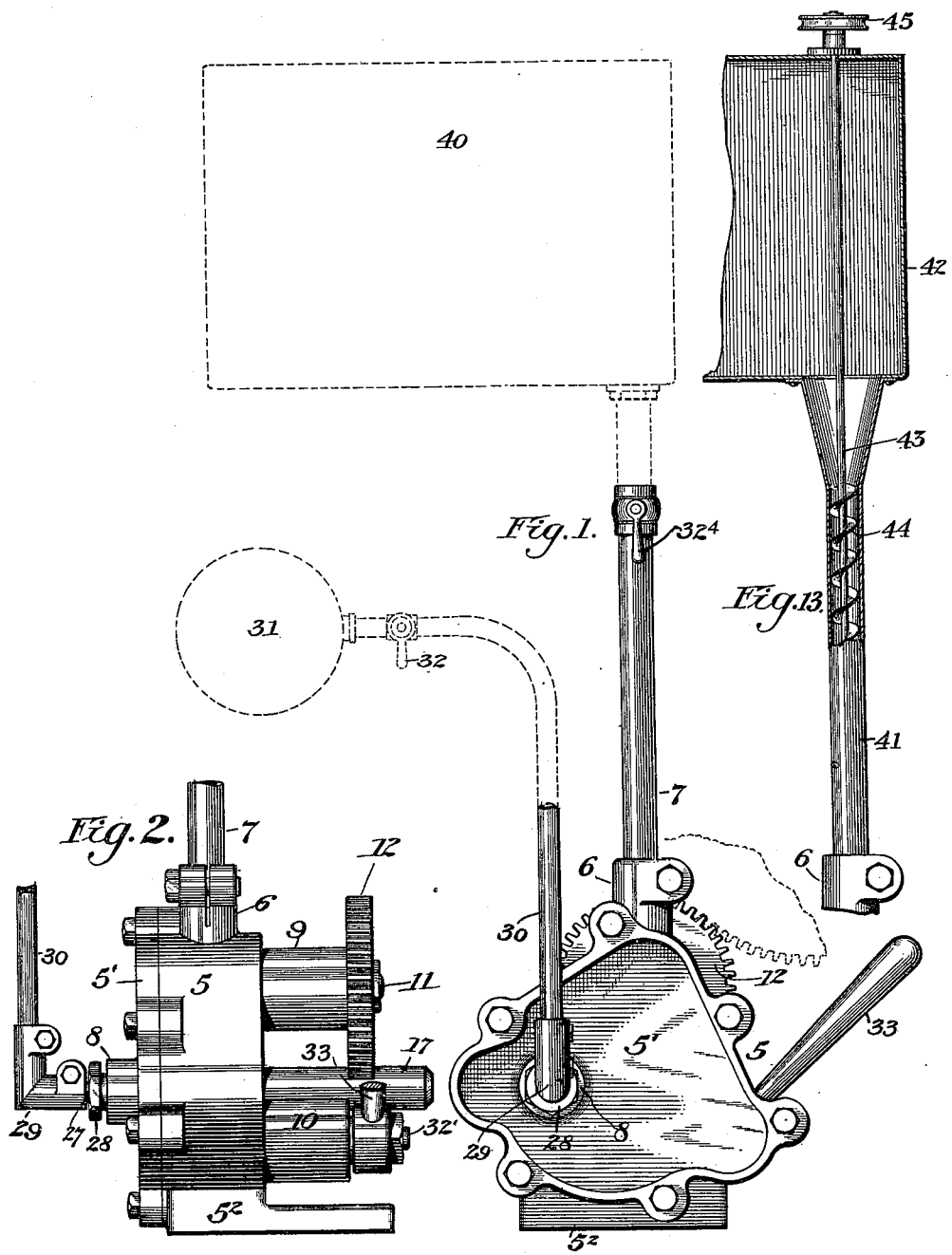
Witnesses:—
A. P. Appleman Jr.
R. W. Pittman
Inventor:
Horace L. Arnold,
By his Attorney,
F. H. Richards.

No. 666,841. Patented Jan. 29, 1901.
H. L. ARNOLD.
MECHANISM FOR MIXING AND MEASURING MATERIALS.
(Application filed May 7, 1900.)
(No Model.) 4 Sheets—Sheet 2.
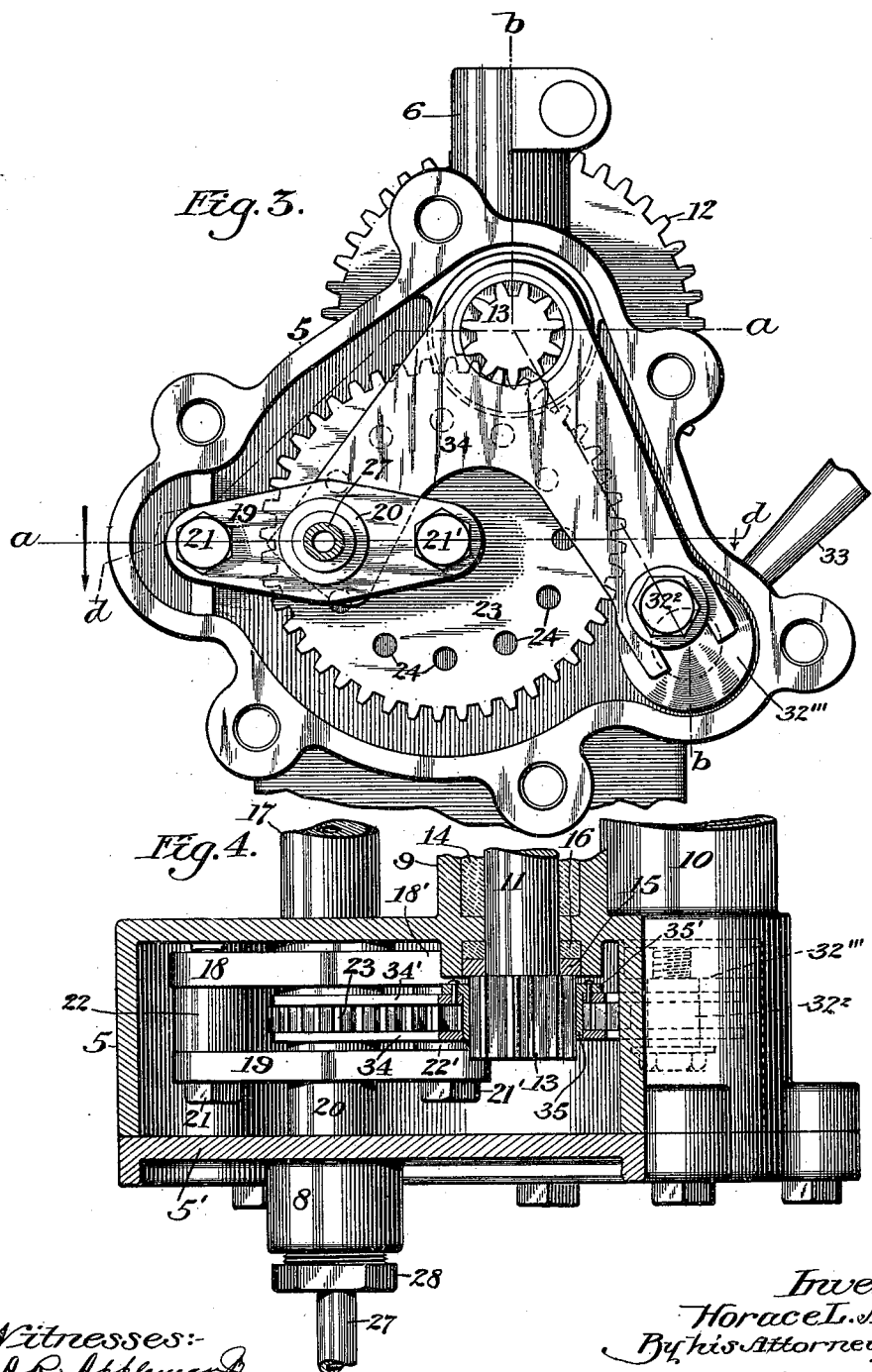

No. 666,841. Patented Jan. 29, 1901.
H. L. ARNOLD.
MECHANISM FOR MIXING AND MEASURING MATERIALS.
(Application filed May 7, 1900.)
(No Model.) 4 Sheets—Sheet 3.

Witnesses:
A. K. Appleman
R. W. Pittman

Inventor,
Horace L. Arnold,
By his Attorney,
F. H. Richards.

No. 666,841. Patented Jan. 29, 1901.
H. L. ARNOLD.
MECHANISM FOR MIXING AND MEASURING MATERIALS.
(Application filed May 7, 1900.)
(No Model.) 4 Sheets—Sheet 4.
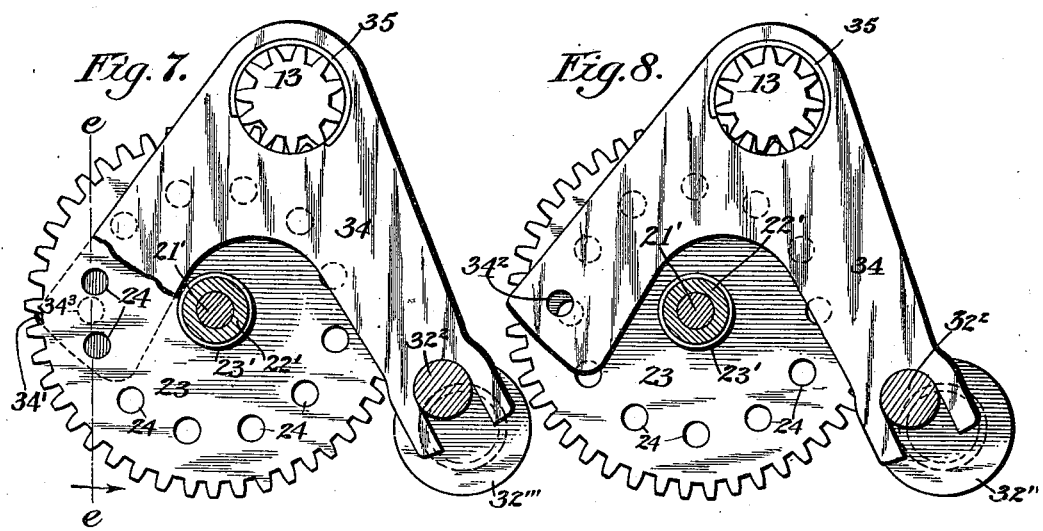
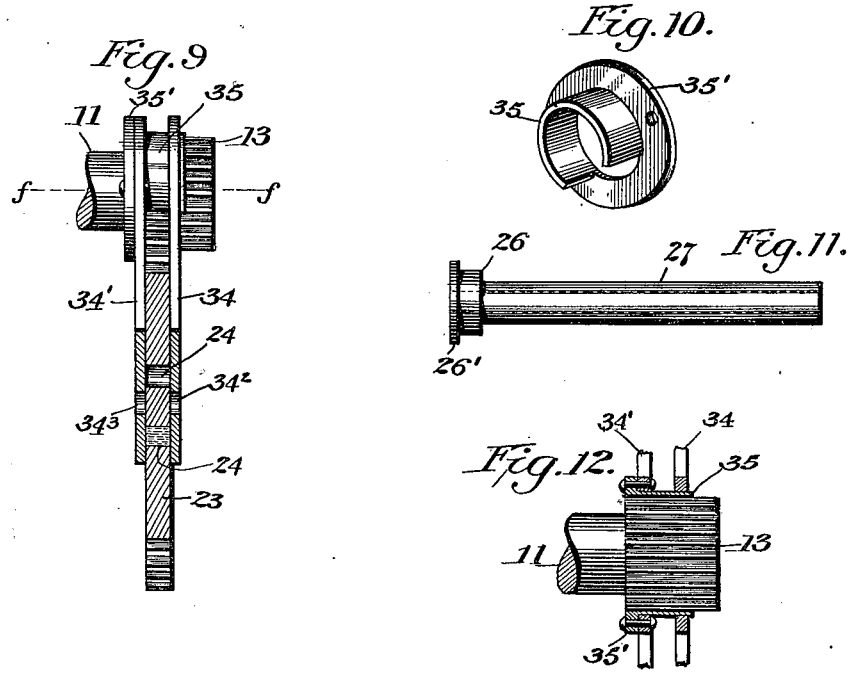
Witnesses:—
Inventor,
Horace L. Arnold,
By his Attorney,

UNITED STATES PATENT OFFICE.

HORACE L. ARNOLD, OF NEW YORK, N. Y., ASSIGNOR TO JOHN A. HILL, OF SAME PLACE.

MECHANISM FOR MIXING AND MEASURING MATERIALS.

SPECIFICATION forming part of Letters Patent No. 666,841, dated January 29, 1901.

Application filed May 7, 1900. Serial No. 15,734. (No model.)

*To all whom it may concern:*

Be it known that I, HORACE L. ARNOLD, a citizen of the United States, residing in New York, (Brooklyn,) in the county of Kings and State of New York, have invented certain new and useful Improvements in Mechanism for Mixing and Measuring Materials, of which the following is a specification.

My invention relates to measuring, mixing, or stirring mechanism; and, primarily, the object thereof is to provide means for delivering a measured quantity, which may be varied as desired, of either liquid or pulverulent material at the desired intervals of time.

A further object of the invention is the provision of mixing and measuring mechanism and air-supply means coöperating therewith, the air being, while the mechanism is in use, under constant pressure from any desired source sufficient to expel a predetermined charge of material and to force it to the point where it is to be utilized.

A further object of the invention is the provision of a receptacle or casing in which the measuring and mixing or stirring devices are mounted, said casing, when the mechanism is in use, being kept constantly filled with the material to be delivered and also having supply and discharge openings and an opening through which suitable pressure means may be introduced.

A further object of the invention is the provision, within a casing or chamber containing the material to be delivered in measured charges, of a movable device having a series of pockets for receiving such material, from which pockets the measured charge is forced.

A further object of the invention is the provision, within a casing or chamber containing the material to be delivered in measured charges, of gearing for rotating a wheel or carrier having a series of pockets for receiving the material contained in said casing and the teeth of which act as beaters or stirrers to mix and churn the material, and thereby, in case of a liquid, keeping its constituents thoroughly intermingled, and in case of a powder thoroughly stirring the same through the path through which the wheel travels to prevent packing within the casing or chamber at points adjacent to the carrier.

A further object of the invention is the provision, in connection with a geared pocket wheel or carrier within the casing, of means for either partially or wholly obstructing the delivery of the contents of the pockets of said wheel.

A further object of the invention is the provision, in connection with a casing containing material to be delivered, of a shaft for supporting gearing adapted to be driven at any desired speed, one of the members of said gearing being in engagement with the teeth of a pocket wheel or carrier for receiving fixed charges of material and in connection with this pocket-wheel to provide a movable valve-plate or valve-plates covering a portion of the pocket-wheel and adapted to be adjusted either to open, partially close, or completely close a pocket in said wheel or carrier when it comes into line with a pressure-receiving opening and a material-delivery opening formed in the casing.

Referring to the accompanying drawings, Figure 1 is an end elevation of my invention, showing by dotted lines a material-supply tank and an air storage or pressure tank connected therewith. Fig. 2 is a side elevation of the invention. Fig. 3 is an end elevation of my improved mechanism with the front plate of the casing or chamber removed. Fig. 4 is a section on line $a\,a$, Fig. 3, looking in the direction of the arrow. Fig. 5 is a vertical section on line $b\,b$, Fig. 3, certain parts being shown in elevation. Fig. 6 is a horizontal section on line $d\,d$, Fig. 3. Fig. 7 is a detail view, partially in section, showing the pocket wheel or carrier and the means for varying the area of or closing the passage by which material is delivered from the pockets of said wheel or carrier. Fig. 8 is a similar view showing the valve-plates adjusted partially to cover the pockets in the wheel or carrier as they pass between said plates. Fig. 9 is a sectional view on line $e\,e$, Fig. 7, looking in the direction of the arrow. Fig. 10 is a detail view in perspective of a sleeve for partially inclosing one of the gear-wheels within the casing. Fig. 11 is a side elevation of the air-supply pipe detached, showing the flange and collar thereon. Fig. 12 is a section on line $f\,f$ of Fig. 9; and Fig. 13 is a view, partially in section and partially in elevation, of a device for feeding pulverulent material to the casing of the machine.

Like numerals designate similar parts throughout the several views.

Referring to the drawings, the numeral 5 designates a casing or chamber (the main body of which may be in the form of a single casting) having a detachable end plate or cover 5', a base $5^2$, a sleeve or coupling 6 for receiving a pipe 7, through which the material to be mixed, stirred, and measured is delivered to the casing, a tubular boss 8 for receiving the air-supply or other pressure connections, and tubular projections 9 and 10, through which shafts hereinafter described are passed.

Journaled in the tubular boss 9 of the casing is a shaft 11, the outer end of which is splined to a gear-wheel 12, and to the inner end of said shaft a long pinion 13 is secured. Within this tubular boss 9 and surrounding the shaft 11 suitable packing 14 is placed, which will prevent the leakage of material from the chamber within the casing along the shaft, a further packing (designated, respectively, by 15 and 16) being mounted within a compartment of the casing adjacent to the inner end of the shaft 11 for a similar purpose, and this last-named packing may consist of perforated disks of vulcanized fiber and felt, or any other suitable material may be employed as a substitute therefor.

Passing through an opening in the rear wall $5^3$ of the casing is a tube 17, having an axial bore of suitable size, and at its inner end, within the casing, said tube is provided with lateral projections 18 and 18', for a purpose hereinafter set forth.

Bolted to the projections 18 and 18' of tube 17 is a plate 19, having a tubular extension 20, the bore of which is of different diameters. Plate 19 is perforated to receive bolts 21 21' and is separated from the projections 18 and 18' by sleeves 22 and 22', through which the bolts pass as they enter threaded openings in said projections 18 and 18', as seen in Fig. 6.

Journaled on the sleeve 22' is a wheel or carrier 23, having a series of pockets 24, which may be of any desired configuration, the hub 23' of said wheel being of less length than the sleeve. As illustrated, these pockets are shown of circular form; but it is distinctly to be understood that the invention is not limited to the specific form represented, for the shape of the pockets may be widely varied without departure therefrom. The teeth of this wheel or carrier 23 are in mesh with the pinion 13 of shaft 11, the gear-wheel 12 of which may be driven at any desired speed; but any other desired means may be employed for actuating said wheel or carrier either in a rotary or partially rotary direction.

Sleeve 20 is chambered at 20' to receive a helical or other form of spring 25, which bears against a shoulder 26, carried by an air-supply pipe 27, and this pipe is provided with a flange 26', which bears on one side against the plate 19 and at its opposite side against a valve or material-delivery-regulating plate hereinafter described.

It will be noticed that the tendency of spring 25, which bears at its outer end against a shoulder of the sleeve 20, is to force the flange 26' closely against the valve-plate 34 to provide a tight fit and prevent leakage of material between the wheel or carrier and plate, and as an incident of this action the gear-wheel 23 and valve-plate 34' are also caused tightly to engage the adjacent devices for the same purpose. The valve-plate and the pocket wheel or carrier are supported for free lateral movement to permit play of said parts in either direction, whereby close contact is made of the valve-plates 34 and 34', the pocket wheel or carrier 23, the charge-delivery tube 17, and the air-pressure tube 27 through the action of the single spring 25, contained in the chamber 20', and no material other than that contained in the pockets of the wheel can enter said charge-delivery tube 17. By this construction the mechanism is made both automatically to adjust itself when first assembled and constantly to adjust itself to take up wear while in operation, and to enable this action to take place the hub of the pocket wheel or carrier 23 is made of less length than the sleeve 22' and has a limited lateral play in either direction between the projection 18' and plate 19, as illustrated in Fig. 6.

Sleeve 20 is reduced at $20^2$, and surrounding this reduced portion is packing 27', compressed by a follower 27'', which is actuated by a nut 28, threaded into the boss 8 of the casing, as shown in Fig. 6, thereby to prevent leakage of material through the front of the casing. Whatever pressure is placed upon the packing is transferred through all the assembled parts specified, and the result is a tight fit, preventing leakage or seepage of the material, which, if permitted, would preclude a charge fixed in quantity from being delivered. Connected with the air-supply pipe 27 is a coupling 29, in which a pipe 30, leading to any suitable source of air-pressure—as, for instance, the compressed-air tank 31, (see dotted lines, Fig. 1)—is mounted, the supply of air being regulated by a valve or other suitable device 32, (also shown by dotted lines in Fig. 1,) carried by said air-pipe. My invention, however, is not limited to any specific means for supplying air constantly under pressure, for ordinarily an air-pump will be utilized for this purpose.

Journaled in the tubular projection 10 is a shaft 32', packed at 32'', to which shaft a handle 33 is applied, and this shaft is equipped at its inner end with a disk 32''', carrying a wrist-pin $32^2$, which works between the walls of slots in the valve-plates 34 34', mounted for swinging movement about the pinion 13, each of these valve-plates being provided at its end remote from the wrist-pin with an opening 34² and 34³, respectively, which openings are adapted to register with the pockets 24 in the wheel or carrier 23 as it rotates between said valve-plates or entirely to close or partially close said pockets 24 as they pass between said plates and carry the material to be delivered by the air-jet device shown or otherwise to the tube 17, leading to the place where the respective charges of material are to be utilized. These valve-plates by occluding more or less of each pocket of the carrier as it, filled with material, approaches the passage between the air-supply tube 27 and the material delivery-tube 17 permit the charges to be regulated with nicety, and any desired part of the material contained within one of the pockets of the pocket-wheel may be delivered as a fixed charge to the place where said charge is to be utilized.

A sleeve 35, having a flange 35', is loosely mounted on the driving-pinion 13 and is free to slide endwise thereupon, and to the flange 35' the valve-plate 34' is secured by rivets or otherwise, as shown in Fig. 12, while the other valve-plate 34 is loosely mounted upon the sleeve 35, so that both valve-plates are free, so far as their support is concerned, to move in either direction for a limited distance. The sleeve is cut out enough on one side to permit the pinion to mesh with the teeth of the pocket-wheel and drive the same. The valve-plates might, however, be mounted on a fulcrum otherwise placed and constructed, the pinion being used as a valve-plate fulcrum because of convenience and simplicity of construction, or other valve mechanism may be employed without departing from the invention, which is not limited in this respect.

It will be noticed that spring 25, bearing against the shoulder 26 of air-tube 27, tends to force with considerable pressure the plate 34 against the side of the pocket-wheel and to force the plate 34' tightly against the end of the delivery-tube 17, thereby causing a close fit between the parts and preventing leakage of material from the contents within the casing from adding an increment to the measured charge to be delivered, and thus causing inexactness of quantity in the measured charges.

When the device is to be employed for feeding pulverulent material, the tube 7, connecting the interior of the casing with the liquid-supply tank 40, (shown by dotted lines in Fig. 1,) is removed and a tube 41, connected with a tank 42 for containing said pulverulent material, is fitted within the socket of the tubular boss or projection 6, and mounted within this tube 41 is a shaft 43, carrying a worm or other suitable device 44, driven by a pulley 45, said worm serving to feed the pulverulent material to and causing it to fill the casing.

In the operation of my improved mechanism when fluid is to be forcibly delivered in measured charges from the casing the valve 32⁴, (see Fig. 1,) carried by the pipe 7, is opened and a fluid—for instance, kerosene or other hydrocarbon—is fed by gravity to fill the interior of the casing 5 completely, and when it fills said casing the shaft 11 is set in motion at the desired speed by gear-wheel 12, intermeshed with any suitable driving mechanism, and the pinion 13 of said shaft engages with the pocket wheel or carrier 23 and rotates the same. As this wheel or carrier is rotated the teeth thereof continually stir or churn the material contained within the casing and in case of a hydrocarbon keep the constituents thereof thoroughly intermingled. Furthermore, the valve-plates 34 and 34' are so positioned that a tight fit is had on each side of the wheel or carrier, and the lighter layers of the hydrocarbon, which naturally are at the top thereof, are prevented from entering the pockets in the wheel or carrier, and the supply to said pockets is always from the bottom layers, which are of the greatest specific gravity. In this way when a hydrocarbon is employed charges containing heavier constituents of material are first supplied, and as the wheel or carrier rotates and brings one of the pockets into a line to register with the openings in the air-supply pipe 27 (when such a pressure device is employed) and the charge-delivery pipe 17 said charge is atomized by the air and forced from the pocket to the point where it is to be utilized.

Wheel or carrier 23 may of course be driven at any desired rate of speed, and if the valve-plates 34 and 34' are set to more or less cover the openings in the pockets as they pass by the registration-points between said tubes 17 and 27 it will be readily seen that a charge of less than the full cubic contents of one pocket of the pocket-wheel may be supplied to the point where it is to be utilized.

If pulverulent material is employed, the tube 7 and liquid-supply tank 40 are removed from the casing and the tube 41 and supply-tank 42 applied thereto, the pulverulent material being, as above stated, positively fed to fill the casing by the worm or screw 44 or by any other suitable device which may be substituted therefor. When this class of material is employed, the teeth of the wheel or carrier 23 act in some degree as stirring devices to prevent the packing of such material within the casing adjacent to the wheel or carrier, and when the filled pockets of said wheel or carrier come consecutively into line with the openings in the air-pipe 27 and charge-delivery pipe 17 the air being under constant pressure immediately forces the whole or part of the charge contained in any pocket to the delivery-point.

While my invention is not limited in use, yet I have found in practice that it is well adapted for supplying charges of material to what are known as "internal-combustion" engines, and it is well adapted to feed either liquid fuel—as kerosene or gasolene—or powdered fuel—as wheat-flour, cornmeal, or wood-dust—to said engines.

While the measuring wheel or carrier 23 is shown pierced with a circle of holes or pockets equally spaced and concentric with the axis of said wheel and said pockets will be filled with the material contained in the casing as said wheel revolves, yet it is distinctly to be understood that the form, character, or size of said pockets is immaterial and that they may be of different shapes from those illustrated by the drawings and also differently arranged with respect to the wheel.

The thickness of the measuring wheel or carrier and the diameter of the measuring holes or pockets may be such that the cubic contents of each hole or pocket will equal the maximum bulk of each single charge to be delivered, and while means are shown for isolating the contents of each measuring-wheel hole or pocket from the surrounding and adjacent bulk of material contained in the closed casing 5, yet the exact number of measuring holes or pockets covered by the isolating-plates is not of particular importance; but at least one hole or pocket must, however, be completely covered by said isolating plates or valves 34 and 34', and more than one of said measuring holes or pockets may be so covered. Generally speaking, the greater the number of measuring holes or pockets exposed to the bulk of the material in the casing the greater the probability that each of said holes or pockets will be fully filled by the surrounding material in the casing as the measuring wheel or carrier revolves. While I have shown as a means for effecting the translation of the contents of the isolated measuring hole or pocket inclosed between the valve-plates 34 and 34' an air-pressure tube 27 and a charge-delivery tube 17, yet it is distinctly to be understood that these means may be variously modified and other means than air-pressure may be employed, if desired, for forcing the charge of material from a pocket in the wheel or carrier 23 to said charge-delivery tube 17.

In case the measuring and mixing mechanism is employed for feeding charges of fuel to a combustion-motor the tube 27 is in the construction illustrated supplied with constant air-pressure from the storage-tank 31 or otherwise, and the pockets of the measuring wheel or carrier being filled with material a certain part, variable at the will of the operator, of the contents of one measuring-wheel hole or pocket will at the required time be atomized by the air-pressure and driven to the extremity of the delivery-tube 17, which in the instance noted would be made to connect with the charge or intake passage leading to the motor-cylinder.

With the present forms of combustion-motors in which gasolene or other hydrocarbon is employed as fuel it is well known that the forms of carbureter now used draw off first the more volatile elements of the hydrocarbon, leaving the heavier parts, which less readily combine with air, until the last, and thus produce undesirable changes in the constitution of the charge to be delivered to the motor-cylinder. By placing the material-supply tank, as shown in the drawings, above the casing 5 the operation is always to fill said casing from the heaviest part of the fluid contained in the tank, and the measuring-wheel holes or pockets are filled from the bottom of the hydrocarbon contained in the casing, and in consequence of this gravity arrangement it is impossible to supply the motor with the lighter parts of the contents of the supply tank or casing first, and hence by the means described I am enabled to insure a fairly-constant charge constitution, which is the first essential in uniform internal-combustion-motor performance.

Many of the details of the mechanism shown and described may be variously modified without departure from my invention, and it is not limited to the precise construction shown. The measuring wheel or carrier may be variously mounted for movement and may be driven at one speed or another speed, as desired, and so, too, the valve-plates shown and described may be variously modified without departure from my invention, which is not, as above stated, limited in this respect to the details shown and described either as regards said plates or the means for operating the same.

What I claim is—

1. The combination, with a receptacle for containing material, of a movable carrier within the receptacle and having pockets for receiving charges of such material; means for forcing the charges from said pockets; a valve adjustable to control the amount of material forced from the pockets; means for adjusting said valve; and means for actuating the carrier.

2. The combination, with a receptacle for containing material, of a revoluble carrier mounted within said receptacle and having pockets for receiving fixed charges of material; means for forcing the charges from the pockets of said carrier; a valve adjustable to control the amount of material forced from the pockets; and means for rotating the carrier.

3. The combination, with a receptacle, of means for supplying material to said receptacle; a continuously-movable carrier having pockets for receiving fixed charges of material; a valve adjustable to control the amount of material forced from the pockets; means for adjusting the valve; and means for forcing the charges of material from the pockets by pneumatic pressure.

4. The combination, with a receptacle for containing material, of feed-supply means for said receptacle; a rotary carrier having pockets for receiving charges of material; means for continuously rotating said carrier; means for forcing the charges of material from the pockets in the carrier; a valve adjustable to control the amount of material forced from the pockets; means for adjusting said valve; and means for delivering said charges to the point where they are to be utilized.

5. The combination, with a receptacle for containing material, of a revoluble wheel having pockets for receiving charges of such material; gearing for rotating said wheel; a valve adjustable to control the amount of material forced from the pockets; means for adjusting the valve; means for feeding the material to the receptacle; and means for delivering the charges of material from the pockets in the wheel.

6. The combination, with a receptacle for containing material, of a carrier having pockets for receiving charges of such material, and mounted within said receptacle; gearing for actuating said carrier; valves adjustable to control the amount of material forced from the pockets, said valves being located at each side of the carrier; means for adjusting said valves; means for forcing by pneumatic pressure charges of material from the pockets in the carrier; and means for delivering said charges to the place where they are to be utilized.

7. The combination, with a receptacle, of means for supplying material to said receptacle; a carrier mounted within the receptacle; means for actuating said carrier; valves adjustable to control the amount of material forced from the pockets in said wheel; means for simultaneously adjusting said valves; and means for forcing the material from said pockets.

8. The combination, with a receptacle, of a toothed pocket wheel or carrier mounted for movement within said receptacle; means for supplying material to the receptacle; a valve adjustable to control the amount of material forced from the pockets; means for adjusting the valve; a pinion in engagement with the toothed wheel; means for actuating said pinion; and means for forcing the material from the pockets of the wheel.

9. The combination, with a receptacle, of means for supplying material to said receptacle; a toothed pocket-wheel the pockets of which receive charges of material from the mass contained within the receptacle; a pinion for driving said wheel; means for forcing the charges of material from the pockets of the wheel; a delivery-tube into which said charges are forced; valve mechanism; and means for preserving a tight joint between the wheel, the valve mechanism and the charge-forcing and charge-delivering devices.

10. The combination, with a receptacle, of a carrier having a series of pockets mounted for movement within said receptacle; means for actuating said carrier; valve mechanism for controlling the discharge of material from the pockets of the carrier; means for forcing charges of material from said pockets; and means for adjusting the valve mechanism.

11. The combination, with a receptacle, of means for supplying material thereto; a movable carrier having pockets for receiving charges of material from the mass contained within the receptacle; means for actuating said carrier; means for forcing the charges contained in the pockets from said carrier; and valves located on each side of the carrier and adjustable to control the amount of material delivered from the pockets.

12. The combination, with a receptacle, of means for supplying material thereto; a toothed carrier having pockets for receiving charges of material from the mass contained in said receptacle; means for actuating said carrier; and means for occluding at will a pocket of the carrier, and for regulating the amount of material forced from the pockets of the carrier.

13. The combination, with a receptacle, of a carrier movably mounted therein and having a series of pockets for containing fixed charges of material; movable valve-plates; means for adjusting said valve-plates with reference to the carrier; means for forcing the carrier and valve-plates together; and air-pressure mechanism for forcing the contents of the pockets from said carrier.

14. The combination, with a receptacle, of a toothed pocket-wheel; gearing for actuating said pocket-wheel; valve-plates mounted for swinging movement within the receptacle; means for actuating said valve-plates; a pressure-delivering device for forcing the contents out of each pocket of the wheel; and means for delivering the charges to the desired point.

15. The combination, with a receptacle, of a shaft journaled for rotation therein; a toothed pocket-wheel carried by said shaft; gearing for actuating said wheel; valve-plates mounted for swinging movement within the receptacle; means for adjusting said valve-plates; and means for forcing charges of material from the pockets of said wheel.

16. The combination, with a receptacle, of means for supplying material thereto to fill the same; a toothed carrier having pockets and movably mounted within said receptacle; an air-pressure-receiving device; a valve mounted for swinging movement; a charge-delivering device; and means for maintaining a tight joint between the carrier the valve and said air-pressure and charge-delivering devices.

17. The combination, with a receptacle, of a carrier having pockets; movable valve mechanism operative on each side of said carrier and adjustable to control the amount of material forced from the pockets; means for forcing charges of material from the pockets; means for delivering said charges; and means for maintaining tight joints between the carrier, the valve mechanism, and the charge forcing and delivering devices.

18. The combination, with a carrier having a series of pockets and with means for supplying material to said pockets, of movable valve-plates between which the carrier passes; means for adjusting said valve-plates whereby they control the amount of material forced from the pockets; and means for discharging the material from the pockets.

19. The combination, with a receptacle, of a toothed carrier having a series of pockets concentrically disposed therein; means for actuating said carrier; a series of valve-plates adjustable to control the amount of material forced from the pockets; means for adjusting said valve-plates; means for forcing the charges of material from the pockets of the carrier; and means for delivering said charges at the points desired.

20. The combination, with a receptacle for containing material, of a revoluble carrier having a series of pockets; valve-plates mounted for swinging movement and each having an arm provided with a slot; and means coöperating with the slots of said valve-plates for adjusting the same.

21. The combination, with a receptacle for containing material, of a movably-mounted carrier having pockets for receiving charges of material from the mass in said receptacle; means for actuating said carrier; valve-plates mounted for swinging movement and serving to occlude more or less of the area of each of said pockets as the pockets pass between the plates at a certain point; means for adjusting said valve-plates; and means for forcing the charges contained in the pockets from the carrier.

22. The combination, with a receptacle, of a toothed carrier having a series of pockets mounted for rotation therein; means for supplying material to said receptacle; movable valve-plates for controlling the passage of material from the pockets of said carrier; a shaft; and a wrist-pin carried by said shaft and operating within slots of the valve-plates.

23. The combination, with a receptacle, of a sleeve mounted therein and carrying at its inner end a plate; an air-delivery tube supported in said sleeve; a carrier having pockets for receiving material from the mass contained within the receptacle; valve mechanism for regulating the passage of material from said pockets; and means for forcing the carrier and valve mechanism into close contact.

24. The combination, with a receptacle for containing material, of a sleeve mounted therein and carrying at its inner end a plate; an air-delivery tube supported in said sleeve; a carrier having pockets for receiving material from the mass contained within the receptacle; valve mechanism for regulating the passage of material from said pockets; means for forcing the carrier and valve mechanism into close contact; and a charge-delivery tube coöperating with said parts.

25. The combination, with a receptacle and with means for supplying material to said receptacle, of a toothed pocket-wheel mounted for rotation within said receptacle; a pinion for rotating said wheel; valve mechanism sleeved upon the pinion; means for adjusting said valve mechanism; and means for forcing charges of material from the pockets in said wheel.

26. The combination, with a receptacle, of means for supplying material thereto; a toothed wheel; a pinion engaging with said wheel; valve mechanism on each side of said wheel; means for adjusting said valve mechanism; means for forcing the valve mechanism and the pocket-wheel laterally; and a charge-delivery tube coöperating with said valve mechanism and wheel.

27. The combination, with a receptacle for containing material, of a toothed pocket-wheel mounted for rotation within said receptacle; a pinion for rotating said pocket-wheel; valve-plates sleeved upon said pinion and capable of lateral movement thereon; means for forcing the charges of material from the pockets in said wheel; a charge-delivery tube; and means for effecting a close contact between the valve mechanism, the charge-forcing means, the pocket-wheel, and said delivery-tube.

28. The combination, with a receptacle for containing material, and with means for supplying material to said receptacle, of a toothed carrier having pockets; means for actuating said carrier; valve mechanism for regulating the amount of material discharged from the pockets; an air-pressure device; a charge-delivery tube; and means for maintaining a tight joint between the air-pressure device, the valve mechanism, the pocket-wheel, and the charge-delivery tube.

29. The combination, with a receptacle for containing material, of a carrier having a series of pockets and mounted for limited lateral movement within said receptacle; valve mechanism adjustable to control the amount of material discharged from the pockets; means for adjusting said valve mechanism; and means for forcing charges of material from said pockets.

30. The combination, with a receptacle for containing material, of a carrier having a series of pockets for receiving charges of material from the mass contained within the receptacle; a chambered sleeve having lateral projections mounted within said receptacle; an air-pressure tube mounted within said sleeve; a spring for forcing said tube endwise; a charge-delivery tube having a plate; means for connecting said plate to the projections of the sleeve; and valve mechanism located on both sides of the carrier and between the same and the charge-delivery and air-receiving tubes.

31. The combination, with a receptacle for containing material, of a carrier mounted for rotation within said receptacle and having pockets for receiving measured charges of material from the mass contained within the receptacle; valve mechanism for controlling the amount of material discharged from said pockets; means for adjusting said valve mechanism in an arcual path; means for forcing said valve mechanism and the carrier laterally; and a charge-delivery tube coöperating with said parts to form a tight joint.

HORACE L. ARNOLD.

Witnesses:
FRED. J. DOLE,
R. W. PITTMAN.